United States Patent
Thomeczek et al.

(10) Patent No.: US 8,261,424 B1
(45) Date of Patent: Sep. 11, 2012

(54) PRESS-THRU PLUNGER AND METHODS OF MANUFACTURE AND USE

(75) Inventors: James Thomeczek, Beavercreek, OH (US); Scott Williamson, Beavercreek, OH (US)

(73) Assignee: Northwestern Tools, Inc., Dayton, OH (US)

( * ) Notice: Subject to any disclaimer, the term of this patent is extended or adjusted under 35 U.S.C. 154(b) by 1382 days.

(21) Appl. No.: 11/468,970

(22) Filed: Aug. 31, 2006

(51) Int. Cl.
*B23P 11/00* (2006.01)
*F16N 21/00* (2006.01)

(52) U.S. Cl. ........... 29/505; 29/510; 29/511; 29/520; 29/441.1; 29/442; 29/890.124; 72/370.02; 72/370.13; 72/370.25; 184/105.3; 251/321

(58) Field of Classification Search .......... 29/505, 29/510, 511, 515, 520, 441.1, 441.2, 442, 29/509, 890.124; 72/370.01, 370.02, 370.12, 72/370.13, 370.25; 184/105.3; 251/321
See application file for complete search history.

(56) References Cited

U.S. PATENT DOCUMENTS

| | | | | |
|---|---|---|---|---|
| 791,330 A | * | 5/1905 | Dodge | 29/505 |
| 1,315,484 A | * | 9/1919 | Fesler | 285/315 |
| 1,345,571 A | * | 7/1920 | Yates | 137/614.04 |
| 1,467,508 A | * | 9/1923 | Seng | 285/313 |
| RE16,650 E | * | 6/1927 | Houghton | 137/614.05 |
| 1,644,236 A | * | 10/1927 | Carr | 184/88.1 |
| 1,648,140 A | * | 11/1927 | Manzel | 184/105.3 |
| 1,651,218 A | * | 11/1927 | Murphy | 184/105.3 |
| 1,694,626 A | * | 12/1928 | Roberts | 184/105.3 |
| 1,707,977 A | * | 4/1929 | Davis | 184/105.3 |
| 1,731,768 A | * | 10/1929 | Davis | 184/105.3 |
| 1,748,819 A | * | 2/1930 | Zerk | 285/9.2 |
| 1,884,155 A | * | 10/1932 | Oestnaes et al. | 29/453 |
| 1,957,731 A | * | 5/1934 | Rogers | 184/105.3 |
| 2,232,359 A | * | 2/1941 | Barks | 184/105.3 |
| 2,332,893 A | * | 10/1943 | Clickner | 285/234 |
| 2,400,817 A | * | 5/1946 | Fox et al. | 184/105.3 |
| 2,454,252 A | * | 11/1948 | Heim | 184/105.3 |
| 2,497,758 A | * | 2/1950 | Campbell | 184/105.3 |
| 2,791,137 A | * | 5/1957 | Jones | 72/344 |
| 2,791,914 A | * | 5/1957 | Cornelius | 74/527 |
| 2,918,084 A | * | 12/1959 | Madar et al. | 137/539 |
| 2,976,610 A | * | 3/1961 | Schuck | 29/441.1 |

(Continued)

FOREIGN PATENT DOCUMENTS

GB 2068059 A * 8/1981

OTHER PUBLICATIONS

Vlier, Inc., Product brochure/catalog, pp. 60-61 (w/ front cover), distributed May 24-27, 2005 at the EASTEC trade show in Springfield, Massachusetts.

(Continued)

*Primary Examiner* — Essama Omgba
(74) *Attorney, Agent, or Firm* — Thompson Hine L.L.P.

(57) ABSTRACT

A spring plunger for insertion into an aperture, the spring plunger including a body having a recess and a proximal opening to the recess surrounded by a chamfered rim with the chamfered rim extending at least partially across the recess. A coil spring and plunger are retained within the recess, with the plunger abutting the coil spring and contacting the chamfered rim. Also, a method of manufacturing a spring plunger and a method of use.

13 Claims, 4 Drawing Sheets

U.S. PATENT DOCUMENTS

| | | | | |
|---|---|---|---|---|
| 2,998,635 | A * | 9/1961 | Burritt, Jr. et al. | 29/898.065 |
| 3,099,082 | A * | 7/1963 | Henriksen | 29/523 |
| 3,319,331 | A * | 5/1967 | Fehling et al. | 29/441.1 |
| 3,496,627 | A * | 2/1970 | Mazzier et al. | 29/441.1 |
| 3,502,418 | A * | 3/1970 | Payne | 401/215 |
| 3,568,800 | A * | 3/1971 | Fisher | 184/105.3 |
| 3,581,362 | A * | 6/1971 | Turner | 29/898.09 |
| 3,643,319 | A * | 2/1972 | Payne | 29/441.1 |
| 3,662,462 | A * | 5/1972 | Shiflet | 29/898.045 |
| 3,721,726 | A * | 3/1973 | Schwartzman | 264/249 |
| 3,986,250 | A * | 10/1976 | Belsdorf | 29/511 |
| 4,071,949 | A * | 2/1978 | Ross et al. | 29/818 |
| 4,234,056 | A * | 11/1980 | Farrell | 184/105.3 |
| 4,722,619 | A * | 2/1988 | Reiser et al. | 384/585 |
| 4,871,339 | A * | 10/1989 | Sadegh | 445/7 |
| 5,011,324 | A * | 4/1991 | Putney | 403/328 |
| 5,309,787 | A * | 5/1994 | Soyka et al. | 74/527 |
| 6,330,739 | B1 * | 12/2001 | Ito | 29/513 |
| 6,601,609 | B2 * | 8/2003 | Taylor | 137/614.2 |
| 6,901,958 | B2 * | 6/2005 | Taylor | 137/614.2 |
| 6,941,651 | B2 * | 9/2005 | Radocaj | 29/892.11 |
| 6,971,814 | B2 * | 12/2005 | Rosenzweig et al. | 401/216 |
| 7,185,674 | B2 * | 3/2007 | Taylor | 137/614.2 |
| 7,341,075 | B2 * | 3/2008 | Taylor | 137/614.2 |
| 7,364,208 | B2 * | 4/2008 | Ichimura et al. | 285/382 |
| 7,721,402 | B2 * | 5/2010 | Inoue et al. | 29/441.2 |
| 2002/0179153 | A1 * | 12/2002 | Taylor | 137/540 |
| 2003/0106593 | A1 * | 6/2003 | Taylor | 137/614.2 |
| 2005/0026553 | A1 * | 2/2005 | Bonner et al. | 451/49 |
| 2006/0021660 | A1 * | 2/2006 | Taylor | 137/540 |

OTHER PUBLICATIONS

Erwin Halder KG, Standard Parts catalog, Aug. 2001, pp. 26-27 (w/ front and rear covers).

* cited by examiner

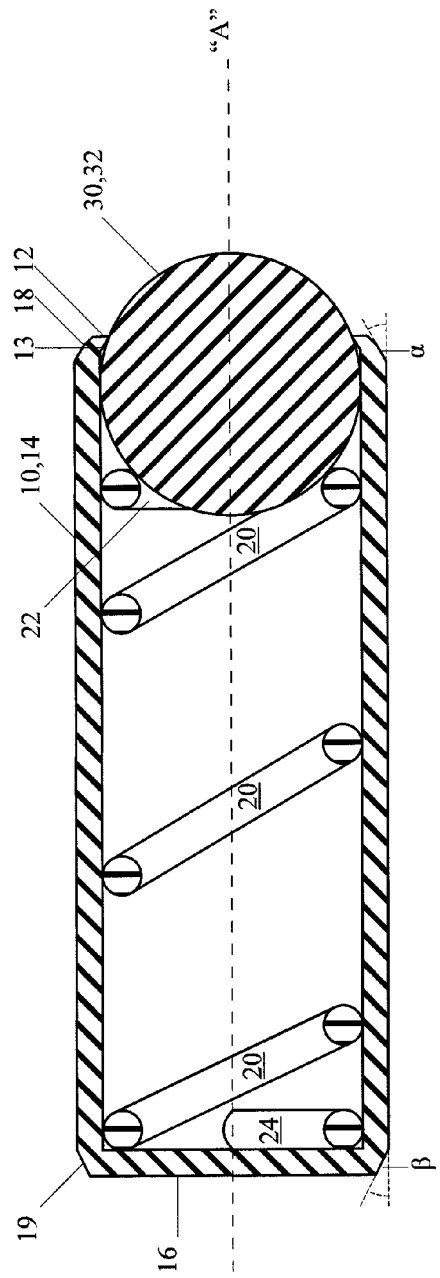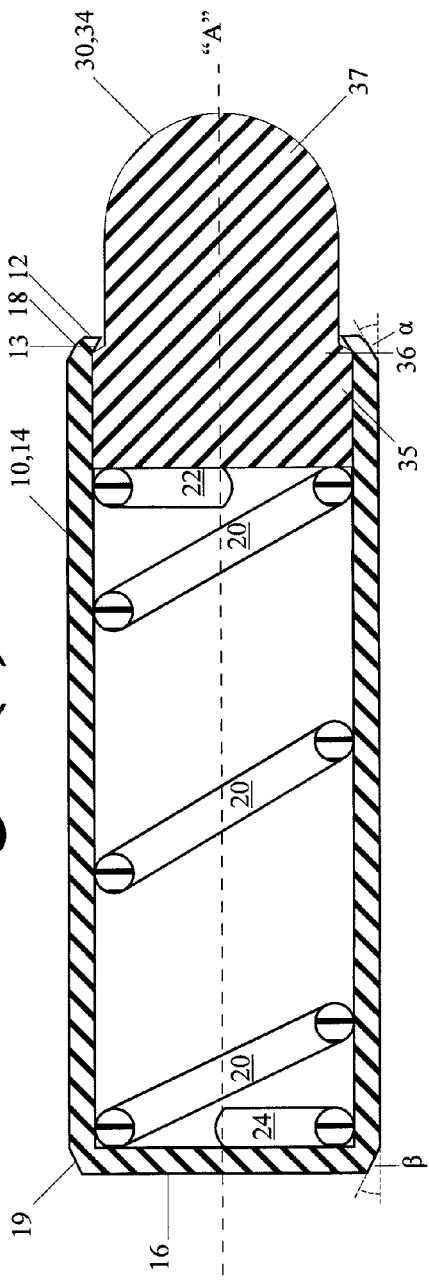

PRESS-THRU PLUNGER AND METHODS OF MANUFACTURE AND USE

BACKGROUND

The present disclosure relates to mechanical machine parts and more particularly, but not exclusively, to a type of machine part commonly known as a "spring plunger" or a "ball and spring plunger."

Mechanical devices known variously as "plungers," "spring plungers," "ball and spring plungers," and "press-fit plungers" are used throughout industry in various applications. Such devices may be used as components of a larger apparatus such as a rotatable work surface to provide a locating feature which allows a user to reliably return the apparatus to a home position, or to provide a positioning feature which allows a user to reliably rotate the apparatus to one of a plurality of predetermined orientations, e.g., a 15 degree angle, a 30 degree angle, a 45 degree angle, etc. Related uses may include indexing, locating, and positioning applications in dies, special tooling, and automatic feed devices. Alternately, such devices may be used as components of an electrical circuit extending between the separable parts of an apparatus. In such uses, the device may be inserted into a conductive socket disposed in the transverse face of a first part, and oppose a conductive contact plate affixed to the transverse face of a second part. In such an arrangement, the device biases a conductive ball or nose against the contact plate, providing a durable electrical contact that is tolerant of reasonable variations in the distance separating the opposing faces of the respective parts. Related uses may include electrical supply or contact sensor applications in dies, automatic feed devices, and other machinery.

Typical constructions of such devices include non-adjustable collared plungers and adjustable threaded plungers. Collared plungers may have a body that consists of a main barrel having an essentially constant outer diameter and a proximal collar surrounding a plunger opening. The collar typically extends laterally outward from the main barrel of the device, and serves to position the device over a blind aperture drilled or otherwise formed in the front or face of a receiving part. Collared plungers may be friction fit into such an aperture, but can loosen or separate from the receiving part in environments that experience substantial vibration and/or thermal cycling because the "tightness" of the friction fit is limited by the force that can be applied to the collar of the device during installation. Such devices are typically inserted into an aperture by lightly hammering or pressing the proximal end of the device, particularly the collar, to drive the device into the aperture, however, when excessive force is applied to the collar it may become damaged. Such damage may include distortion of the outer rim of the collar, which may prevent the collar from sitting flush against the surface of the receiving part, and distortion of the inner rim of the collar, which may prevent the plunger from returning to a fully extended position. Either type of damage may cause the assembly to fail to meet specifications. Typical uses of collared plungers are also restricted by the nature of their construction in that (1) the collar of the device typically rests above the front or face of the receiving part, which exposes the device to potentially damaging strikes from opposing cycling parts or other loose matter and (2) the device must be installed through the front or face of the receiving part, which restricts the range of applications or design configurations that may make use of such a device without substantial design modifications.

Threaded plungers overcome many of the drawbacks associated with collared plungers, but require significant machining and installation preparation. Threaded plungers may have a body consisting of a threaded shaft and a proximal slotted rim surrounding a plunger opening. Such plungers may also include a plastic locking element and/or second slot disposed across a distal wall of the device. Threaded plungers are typically screwed into an aperture that has been tapped to provide complementary threading, and the plastic locking element, if present, serves to frictionally engage the aperture threads to increase the torque that must be applied to install, adjust, or remove the device. Such devices are typically installed by using a plunger wrench that engages the slotted rim of the device while minimizing contact with the plunger, permitting one to screw the device into a threaded aperture in the front or face of a receiving part. Such devices may also be installed by using a narrow-blade screwdriver that engages the second distal slot, if present, permitting one to screw the device into a threaded aperture through the rear of the receiving part. If the device is installed through the front or face of a receiving part with a screwdriver rather than a plunger wrench, the blade of the screwdriver will depress the plunger of the device past the outer surface of the slotted rim during installation. Such excessive travel may overcompress an internal spring, altering the plunger force profile and damaging the device.

Thus there is also a need for a plunger device that may be installed into a drilled or formed aperture through either the front or the rear of a receiving part without additional preparation of the aperture, such as tapping. There is also a need for a non-threaded plunger device that is better able to resist vibration and thermal cycling.

BRIEF DESCRIPTION OF THE DRAWINGS

FIG. 3(*a*) is a cross-sectional view through the longitudinal axis of the press-thru plunger of FIG. 1.

FIG. 3(*b*) is a cross-sectional view through the longitudinal axis of a press-thru-plunger similar to that shown in FIG. 1, but having a plunger nose.

DETAILED DESCRIPTION

Figure 1:
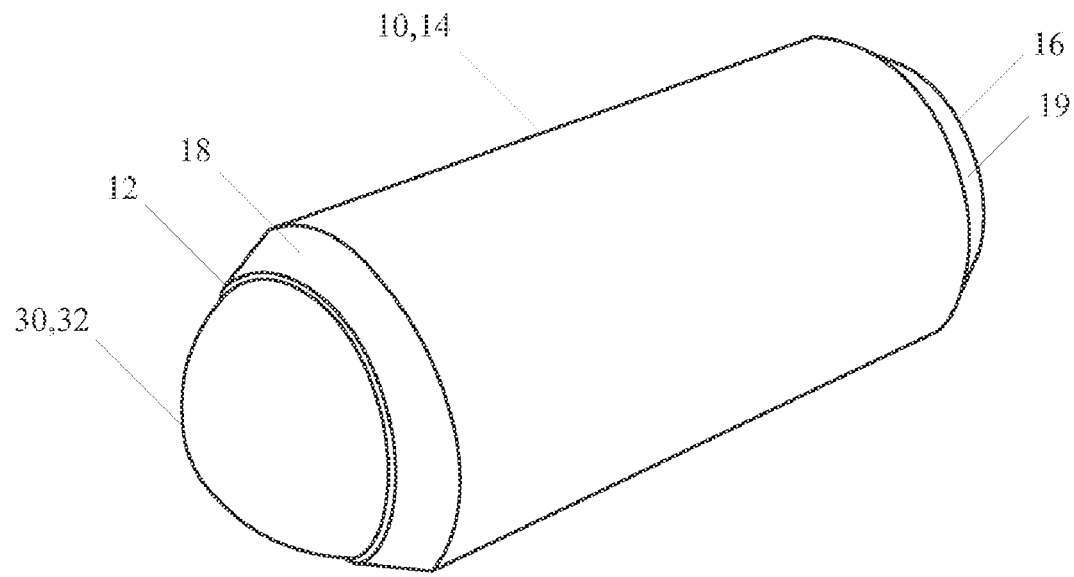
FIG. 1 is a perspective view of a press-thru plunger.
Figure 2:
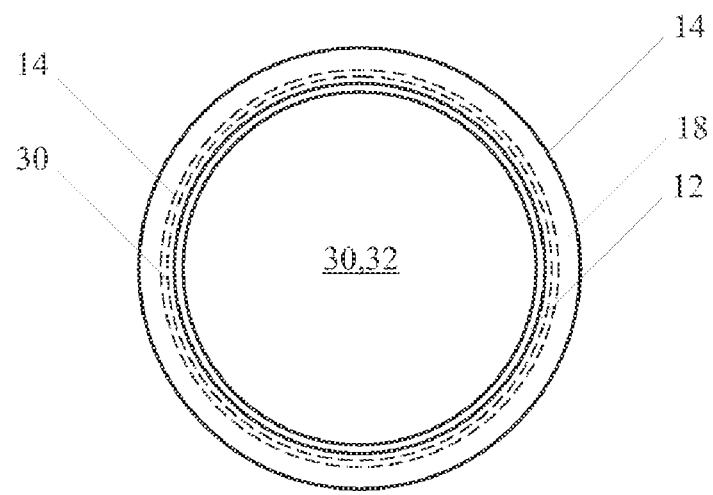
FIG. 2 is an end view of the proximal end of the press-thru plunger of FIG. 1. The inner edge of the main barrel and the outer edge of the plunger are shown as hidden lines.

With reference to FIGS. 1-3, an aspect of a press-thru plunger is shown and includes a body 10, a spring 20, and a plunger 30. Body 10 may be configured as a generally hollow cylinder having a proximal end 12, a main barrel 14, and a distal wall 16. Body 10 may have a typical wall thickness in a range of about 0.016 inch to about 0.032 inch for bodies having an outer diameter of about 0.125 inch to about 0.500 inch and a length of about 0.25 inch to about 1.25 inch. Distal wall 16 may have a typical wall thickness in a range of about 0.016 inch to about 0.032 inch for bodies having an outer diameter of about 0.125 inch to about 0.500 inch and a length of about 0.25 inch to about 1.25 inch. The proximal end 12 of body 10 may include a chamfered rim 18, having an angle off the barrel intersection α, and an interior rim face 13, wherein a portion of the proximal end 12 extends at least partially laterally inward towards a longitudinal axis "A". Chamfer angle α may fall in a range of about 25 degrees to about 55 degrees, and preferably is approximately 30 degrees. Optionally, the distal wall 16 of body 10 may include a chamfered edge 19, having a chamfer angle off the barrel intersection β. Chamfer angle β may fall in a range of about 15 degrees to about 60 degrees, and preferably is approximately 30 degrees, as the chamfered edge 19 serves to assist the insertion of the device into an aperture when the device is inserted through the front or face of a receiving part. Body 10 may be manufactured from various materials depending on the performance characteristics required for a particular application. For example, body 10 may be constructed from carbon steel for general use, from stainless steel for use in high temperature environments, having operating temperatures in a range of about 150 to about 250° C., or from other metallic materials. Body 10 may also optionally be constructed from engineering plastics such as nylon or acetal resin/polyoxymethylene, which is sold under the trade name "DELRIN®" by DuPont Engineering Polymers, a division of E. I. duPont de Nemours & Co. of Wilmington, Del.

Spring 20 may be configured as a coil compression spring. Spring 20 may include a substantially closed proximal end 22 and a substantially closed distal end 24, however, either or both ends may terminate in a open coil if a longer operating travel is required for a particular configuration and application. In an assembled configuration, spring 20 may be coaxially retained within the main barrel 14 of body 10, abutting the distal wall 16 of body 10. The details of spring construction, e.g., spring material, wire diameter, and number of active coils, may be varied to alter the initial force and full stroke force that must be applied to cause spring 20 to compress within body 10. The spring material may also be varied depending on the performance characteristics required for a particular application. For example, spring 20 may be manufactured from music wire for general machine use, from stainless steel for use in high temperature environments, or from alternate materials used in the manufacture of coil springs such as oil-tempered low-carbon, chrome silicon, or chrome vanadium steel.

With specific reference to FIG. 3(a), plunger 30 may be inserted into body 10, compressing spring 20 into main barrel 14. Plunger 30 may be configured as a ball 32 having a diameter that is marginally less than the inside diameter of main barrel 14, ranging from about 0.001 inch less than the inside diameter of main barrel 14 to about 0.003 inch less than the inside diameter of main barrel 14. In an assembled configuration, a substantial portion of ball 32 is coaxially retained within main barrel 14 of body 10, abutting spring 20 and contacting the interior rim face 13 of the proximal end 12 of body 10. The interior rim face 13 has a minimum diameter which is less than the maximum diameter of ball 32, such that ball 32 cannot normally be ejected out of body 10.

Alternately, with specific reference to FIG. 3(b), plunger 30 may be configured as a nose 34 having an interior portion 35, an angled portion 36, and an exterior portion 37. Interior portion 35 may be formed as a cylinder having a diameter that is marginally less than the inside diameter of main barrel 14 of body 10, ranging from about 0.001 inch less than the inside diameter of main barrel 14 to about 0.003 inch less than the inside diameter of main barrel 14. Angled portion 36 may be formed or shaped to have a surface extending between the outer surface of interior portion 35 and the outer surface of exterior portion 37 at a 60 degree angle with respect to longitudinal axis "A." In an assembled configuration, nose 34 is coaxially retained within main barrel 14 of body 10, with interior portion 35 abutting spring 20 and angled portion 36 contacting the interior rim face 13 of the proximal end 12 of body 10. The interior rim face 13 has a minimum diameter which is less than the maximum diameter of interior portion 35, such that nose 34 cannot normally be ejected out of body 10.

Plunger 30 may be manufactured from metallic materials such as carbon steel, stainless steel, or copper, or from engineering plastics such as nylon or "DELRIN®". The plunger material may be selected to optimize the design of the press-thru plunger for use in particular applications, matching the physical properties of the plunger to the properties desirable for a particular use. For example, hard materials such as stainless steel may be used when durability and temperature resistance are desired, whereas soft materials such as nylon or "DELRIN®" may be used when the finish of the surface opposing the press-thru plunger must be preserved against wear, scratching, and/or other forms of abrasion. Conductive materials suitable for use in electrical connections may be used when the device is to be used as a component of an electrical or sensor circuit.

A press-thru plunger may be manufactured by machining bar stock to produce a body 10, and combining the machined body 10, a spring 20, and a plunger 30 in a press. Bar stock consisting of carbon steel, stainless steel, or any of the various materials discussed previously may be mounted on a screw machine and positioned within the working area. After it has been positioned, the bar stock may be chamfered at its proximal end with a cutting tool to produce a surface having an angle off the barrel intersection α. Angle α may fall in a range of about 25 degrees to about 55 degrees, and preferably is approximately 30 degrees. The bar stock may optionally be chamfered at its distal end with a cutting tool to produce a surface having a chamfer angle off the barrel intersection β. Angle β may fall in a range of about 15 degrees to about 60 degrees, and preferably is approximately 30 degrees. The chamfered proximal end may be hollowed out with a drill to form a first portion of the interior of body 10. Preferably, the bar stock is subsequently reamed through the void created by the drill to form a second portion of the interior of body 10, and even more preferably, the bar stock is subsequently drilled through the voids created by the prior operations with a flat bottom drill bit to form an interior portion of distal wall 16. The drilling operations applied to the bar stock produce a hollow end having an interior diameter that is equal to the inside diameter of main barrel 14. The drilled bar stock may be segmented using a cut-off tool to produce a separated body 10 having a distal wall 16. Persons having skill in the art will recognize that these operations may be performed using alternate machines that permit the performance of one or more of the aforesaid operations, and that the operations described herein are not to be limited by the particular machines and tools described above.

Optionally, the chamfering operations may be combined and the cut-off operation simplified by applying a single tool to the bar stock to form a notch having a distal surface having an angle off the barrel intersection α and a proximal surface having a chamfer angle off the barrel intersection β. A cut-off tool may be used to segment the bar stock at the notch, producing a segmented piece having a finished distal end including a chamfered edge 19 and a bar stock having a chamfered proximal end that may be hollowed out as described above. This optional sequence will produce an initial waste piece, but each subsequent repetition will produce a machined body 10 while eliminating an otherwise distinct chamfering operation.

The bar stock used to produce a machined body 10 is preferably oversized, such that the outside diameter of machined body 10 exceeds the nominal outside diameter of the finished device The exterior surface of the machined body 10 may subsequently be ground to produce a device having an actual outside diameter in a range of about 0.001 inch to about 0.002 inch larger than the nominal outside diameter of the device to provide an oversized friction fit feature that will be discussed in further detail below. Preferably, the machined bodies 10 are processed in a centerless grinding machine to obtain the desired actual outside diameter.

Figure 4:
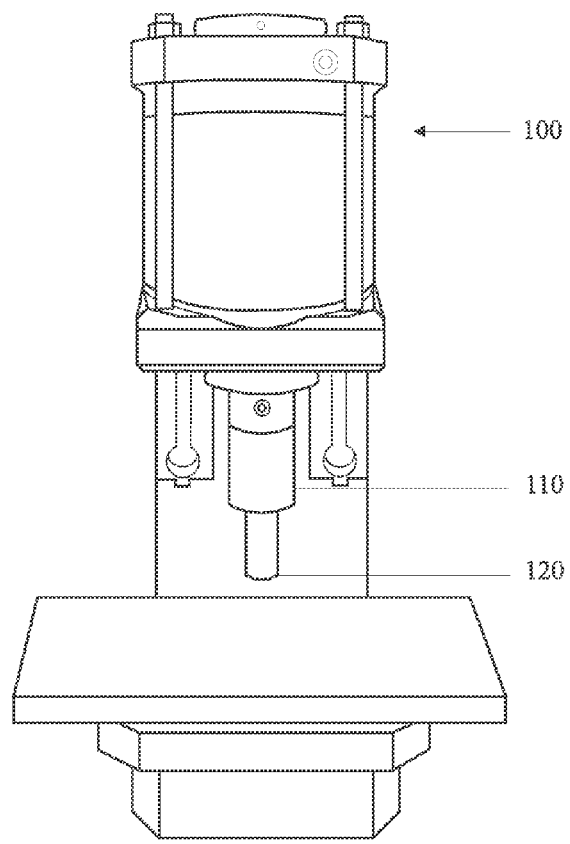
FIG. 4 is a perspective view of a press having a punch for assembling a press-thru plunger.
Figure 5:
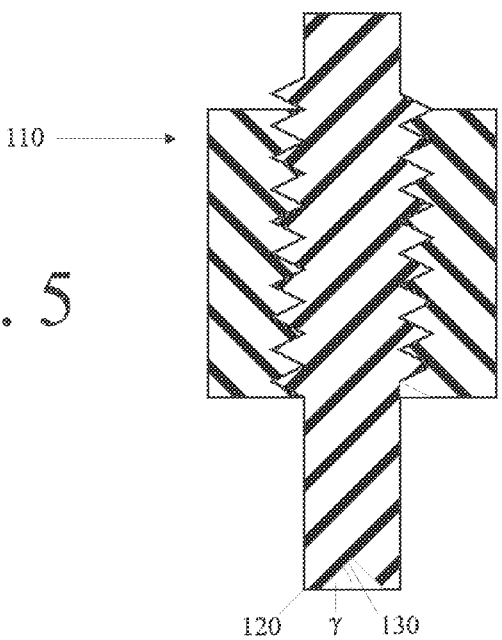
FIG. 5 is a cross-sectional view through the longitudinal axis of the punch shown in FIG. 4.

With reference to FIGS. 4 and 5, spring 20 and plunger 30 may be inserted into a machined body 10 on the work surface of a press 100. The press 100 may be equipped with a punch 110 held in the press fixture, the punch 110 providing a tool surface 120 including inclined and converging sidewalls 130 having an angle of inclination γ of approximately 45 degrees from the horizontal. The angle of inclination may very in a range of about 30 degrees to about 60 degrees, but excessive deviation from an angle of 45 degrees increases the likelihood that the force applied by the press will distort or collapse the main barrel 14 of body 10. The punch may be prepared by drilling a conical recess in the end of a flat punch using an appropriate bit. Advantageously, the interaction between tool surface 120 and the chamfered proximal end 12 of body 10 creates a self-centering behavior, wherein a press operator may place a body 10 generally under punch 110 and operate the press 100, and any minor deviation in positioning will be corrected by interference between the tool surface 120 and the proximal end 12 as punch 110 descends over body 10.

To assemble the press-thru plunger, the press 100 is operated to apply punch 110 to proximal end 12 of body 10. The punch 110 and tool surface 120 contact and depress the proximal end 12 of body 10, causing converging sidewalls 130 to distort the chamfered proximal end 12 at least partially laterally inwards to produce a chamfered rim 18 and an interior rim face 13. The distortion of proximal end 12 causes interior rim face 13 to extend at least partially laterally inward towards a longitudinal axis "A", and have a minimum diameter which is less than the maximum outer diameter of plunger 30.

The press-thru plunger may be designed to be slightly oversized, i.e., have an actual outside diameter that exceeds an aperture's nominal diameter by distance in a range of about 0.001 inch to about 0.002 inch, to produce a strong frictional engagement between the device and the aperture walls in a receiving part. Because the device is oversized relative to the aperture, the main barrel 14 of the device and the bulk material surrounding the aperture will both be compressed by the act of inserting the device into the receiving part. The mutual compression of the device and the receiving part material may provide a superior resistance to the "spontaneous" movement and disengagement that may occur with collared plunger devices in environments that experience substantial vibration and/or thermal cycling. Additionally, chamfered rim 18 provides a strong and potentially self-centering bearing surface for the installation of a device through the front or face of a receiving part, and distal wall 16 provides a strong bearing surface for the installation of a device through the rear of a receiving part.

Figure 6:
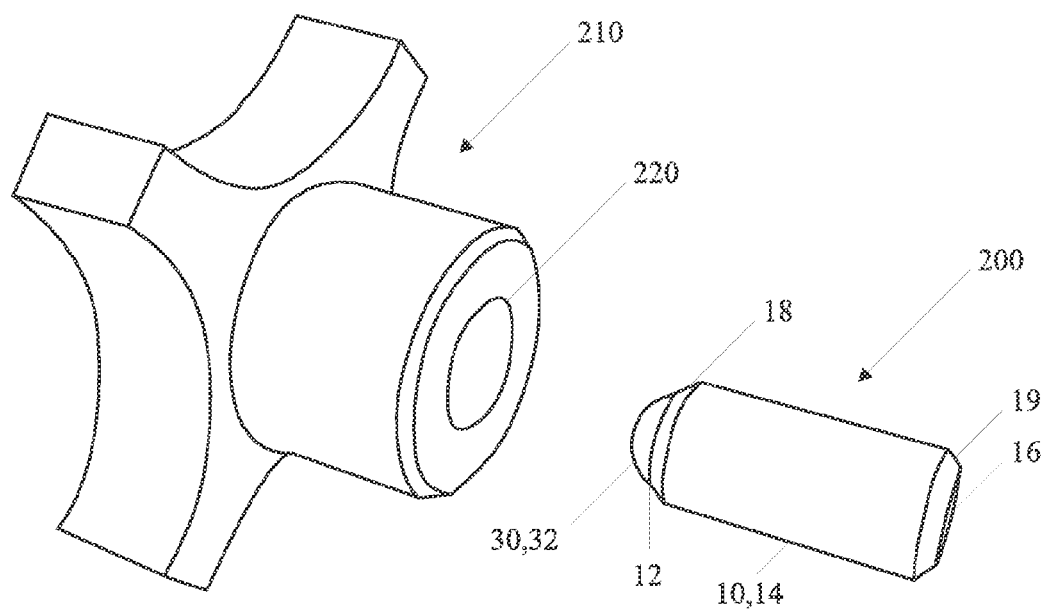
FIG. 6 is an exploded perspective view of a press-thru plunger and a receiving part, the plunger being aligned to be inserted into an aperture through the rear of the receiving part.

With reference to FIG. 6, to install the press-thru plunger 200 in a receiving part 210, a laborer or machine operator, hereinafter referred to generically as a worker, first determines the nominal diameter of the receiving aperture 220. Next, the worker selects a press-thru plunger 200 having a nominal outside diameter that matches the nominal diameter of the aperture 220. By selecting a press-thru plunger having a matching nominal diameter, the worker will in fact select a press-thru plunger having an actual outside diameter that is greater than the actual diameter of the aperture that will receive the press-thru plunger, wherein the actual diameter of the plunger exceeds the actual diameter of the aperture by a distance in a range of about 0.001 inch to about 0.002 inch. If the worker desires to install the device through the rear of the receiving part, the worker may insert the proximal end 12 of the press-thru plunger 200 into the aperture 220 in the receiving part at the rear of the receiving part. The worker may then drive the press-thru plunger 200 into the receiving part by lightly hammering on the distal wall 16 of press-thru-plunger 200 or on an extension rod placed in contact therewith. Preferably, the worker drives the press-thru plunger into the receiving part to a predetermined depth by using a press providing a flat punch having a diameter that is less than the diameter of the aperture 220, such as an appropriately equipped hand arbor. If the worker desires to install the device through the front or face of the receiving part, the worker may insert the distal wall 16 of the press-thru plunger into the aperture 220 in the receiving part 210 at the front or face of the receiving part. The worker may then drive the press-thru plunger into the receiving part by lightly hammering on a soft material such as wood or plastic placed over the proximal end 12 of the device. Preferably, the worker drives the press-thru plunger into the receiving part to a predetermined depth by using a press such as a hand arbor. Even more preferably, a press may be equipped with a aperture-sized punch having an angled tool surface similar to the tool surface 120 described above, or a tool may be configured to have an aperture-sized terminal tool surface that is complementary to the chamfered rim 18 of the press-thru plunger. Workers using such equipment could apply substantially greater insertion forces directly to the proximal end 12 and body 10 of the press-thru plunger device, which may permit the device to be inserted into substantially harder materials without the increased risk of damage that may be present when force is applied to the inner portions of the chamfered rim 18.

What is claimed is:

1. A method of manufacturing a spring plunger comprising:

providing a press having a tool surface including an inclined sidewall defining a first recess, wherein said first recess is a substantially conical recess, and said inclined sidewall has an angle of inclination in a range of about 30 degrees to about 60 degrees from the horizontal;

providing a spring plunger body configured as a generally hollow cylinder having a longitudinal axis and including a second recess, a proximal opening to said second recess, and a chamfered proximal end each coaxially disposed about said longitudinal axis;

inserting a distally-disposed coil spring and a proximally-disposed plunger into said second recess through said proximal opening to form an assembly;

positioning said assembly for contact by said press;

operating said press to contact said inclined sidewall against said chamfered proximal end of said assembly, wherein said chamfered proximal end is directed by said inclined sidewall at least partially across said second recess toward said longitudinal axis so as to depressibly capture said plunger within said spring plunger body; and removing said assembly with the depressibly captured plunger from said press;

wherein said spring plunger body is provided by design with an actual outside diameter which is about 0.001 inch to about 0.002 inch larger than an indicated nominal outside diameter of the spring plunger body.

2. The method of claim 1 wherein said inclined sidewall has an angle of inclination of approximately 45 degrees from the horizontal.

3. The method of claim 1 wherein said chamfered proximal end has a chamfer angle in a range of about 25 degrees to about 55 degrees.

4. The method of claim 3 wherein said chamfered proximal end has a chamfer angle of approximately 30 degrees.

5. The method of claim 1 wherein said inclined sidewall has an angle of inclination of approximately 45 degrees from the horizontal and said chamfered proximal end has a chamfer angle of approximately 30 degrees, whereby said positioning step includes a self-centering behavior.

6. The method of claim 1 wherein said spring plunger body is provided by design with an actual outside diameter which is about 0.001 inch to about 0.002 inch larger than an indicated nominal outside diameter of the spring plunger body.

7. The method of claim 6 wherein the exterior surface of said spring plunger body is ground in a centerless grinding machine to produce said actual outside diameter.

8. A method of manufacturing a spring plunger comprising:
providing a press having a tool surface including an inclined sidewall defining a first recess, wherein said tool surface includes multiple inclined and converging sidewalls defining said first recess, and said inclined sidewalls each have an angle of inclination in a range of about 30 degrees to about 60 degrees from the horizontal;
providing a spring plunger body configured as a generally hollow cylinder having a longitudinal axis and including a second recess, a proximal opening to said second recess, and a chamfered proximal end each coaxially disposed about said longitudinal axis;
inserting a distally-disposed coil spring and a proximally-disposed plunger into said second recess through said proximal opening to form an assembly;
positioning said assembly for contact by said press; and
operating said press to contact said inclined sidewall against said chamfered proximal end of said assembly, wherein said chamfered proximal end is directed by said inclined sidewall at least partially across said second recess toward said longitudinal axis to depressibly capture said plunger within said spring plunger body; and
removing said assembly with the depressibly captured plunger from said press;
wherein said spring plunger body is provided by design with an actual outside diameter which is about 0.001 inch to about 0.002 inch larger than an indicated nominal outside diameter of the spring plunger body.

9. The method of claim 8 wherein said inclined sidewalls each have an angle of inclination of approximately 45 degrees from the horizontal.

10. The method of claim 8 wherein said inclined sidewalls each have an angle of inclination of approximately 45 degrees from the horizontal and said chamfered proximal end has a chamfer angle of approximately 30 degrees, whereby said positioning step includes a self-centering behavior.

11. The method of claim 8 wherein said chamfered proximal end has a chamfer angle in a range of about 25 degrees to about 55 degrees.

12. The method of claim 11 wherein said chamfered proximal end has a chamfer angle of approximately 30 degrees.

13. The method of claim 8 wherein the exterior surface of said spring plunger body is ground in a centerless grinding machine to produce said actual outside diameter.

\* \* \* \* \*